United States Patent
Hamanaka

(10) Patent No.: US 9,108,472 B2
(45) Date of Patent: Aug. 18, 2015

(54) PNEUMATIC HEAVY-DUTY TIRE HAVING CIRCUMFERENTIAL REINFORCING LAYER AND SIPES

(75) Inventor: Hideki Hamanaka, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/346,699

(22) PCT Filed: Sep. 22, 2011

(86) PCT No.: PCT/JP2011/071686
§ 371 (c)(1),
(2), (4) Date: Jun. 3, 2014

(87) PCT Pub. No.: WO2013/042257
PCT Pub. Date: Mar. 28, 2013

(65) Prior Publication Data
US 2014/0326381 A1 Nov. 6, 2014

(51) Int. Cl.
*B60C 9/22* (2006.01)
*B60C 9/28* (2006.01)
*B60C 11/11* (2006.01)
(Continued)

(52) U.S. Cl.
CPC ........... *B60C 11/1204* (2013.04); *B60C 9/0007* (2013.04); *B60C 9/18* (2013.01); *B60C 9/20* (2013.01); *B60C 9/2006* (2013.04); *B60C 9/22* (2013.01); *B60C 9/28* (2013.01); *B60C 11/11* (2013.01); *B60C 11/12* (2013.01); *B60C 11/1263* (2013.04); *B60C 2009/2083* (2013.04); *B60C 2009/2252* (2013.04);
(Continued)

(58) Field of Classification Search
CPC .. B60C 9/28; B60C 11/12; B60C 2011/1213; B60C 11/1263; B60C 11/11; B60C 11/1204; B60C 2011/1254; B60C 9/22; B60C 2009/2252; B60C 2009/2257
USPC ........................ 152/209.17, DIG. 3, 531, 538
See application file for complete search history.

(56) References Cited

U.S. PATENT DOCUMENTS 4,676,290 A * 6/1987 Tansei et al. ................... 152/902
4,884,606 A * 12/1989 Matsuda et al. .......... 152/DIG. 3
(Continued)

FOREIGN PATENT DOCUMENTS

JP   S61-108003         5/1986
JP   04-087808 A   *   3/1992
(Continued)

OTHER PUBLICATIONS

Machine translation for Japan 2004-306872 (no date).*
(Continued)

*Primary Examiner* — Steven D Maki
(74) *Attorney, Agent, or Firm* — Thorpe North & Western

(57) ABSTRACT

In the pneumatic tire, the blocks above the circumferential reinforcing layer have at least one sipe. Also, the sipe has a bent shape, in a plan view, with two flex points P1, P2, and has a closed structure with two end points Q1, Q2 terminating within the block. Also, the angle α between the line that connects the flex points P1, P2 and the tire circumferential direction is within the range such that $0° \le \alpha \le 10°$. Also, the angle β1 between the line connecting the flex point P1 and the end point Q1 and the tire circumferential direction, and the angle β2 between the line connecting the flex point P2 and the end point Q2 and the tire circumferential direction are within the range such that $35° \le \beta 1 \le 55°$ and $35° \le \beta 2 \le 55°$.

19 Claims, 10 Drawing Sheets

(51) Int. Cl.
  *B60C 11/12*  (2006.01)
  *B60C 9/20*   (2006.01)
  *B60C 9/18*   (2006.01)
  *B60C 9/00*   (2006.01)

(52) U.S. Cl.
  CPC ............... *B60C 2009/2257* (2013.04); *B60C 2011/1213* (2013.04); *B60C 2011/1254* (2013.04)

(56) References Cited

U.S. PATENT DOCUMENTS

| | | | |
|---|---|---|---|
| 2006/0016537 | A1 | 1/2006 | Kuroda |
| 2006/0169381 | A1* | 8/2006 | Radulescu et al. ............ 152/531 |
| 2010/0032072 | A1* | 2/2010 | Isobe ............................ 152/527 |
| 2010/0116402 | A1 | 5/2010 | Isobe |
| 2010/0294410 | A1* | 11/2010 | Yoshikawa ................... 152/538 |

FOREIGN PATENT DOCUMENTS

| | | | |
|---|---|---|---|
| JP | 2004-306872 |   | 11/2004 |
| JP | 2004-306872 A | * | 11/2004 |
| JP | 2006-056502 |   | 3/2006 |
| JP | 2006-069283 A | * | 3/2006 |
| JP | 2009-073337 |   | 4/2009 |
| JP | 2010-052683 A | * | 3/2010 |
| KR | 2007-0097926 A | * | 10/2007 |

OTHER PUBLICATIONS

Machine translation for Japan 2010-052683 (no date).*
Machine translation for Japan 2006-069283 (no date).*
Machine translation for Korea 2007-0097926 (no date).*
Machine translation for Japan 04-087808 (no date).*
Partial translation for Japan 04-087808 (no date).*
International Search Report dated Jan. 10, 2012, 3 pages, Japan.

* cited by examiner

| | Conventional Example | Comparative Example 1 | Comparative Example 2 | Comparative Example 3 | Comparative Example 4 | Comparative Example 5 | Working Example 1 | Working Example 2 | Working Example 3 |
|---|---|---|---|---|---|---|---|---|---|
| Number of sipe flex points | 0 (linear) | 2 | 2 | 2 | 2 | 2 | 2 | 2 | 2 |
| α [°] (0 [°] ~ 90 [°]) | 0 | 90 | 0 | 15 | 0 | 0 | 5 | 3 | 0 |
| β1, β2 [°] (0 [°] ~ 90 [°]) | - | - | 90 | 45 | 30 | 60 | 35 | 35 | 55 |
| D1/D2 | 0.90 | 0.90 | 0.90 | 0.50 | 0.50 | 0.50 | 0.50 | 0.50 | 0.50 |
| S1, S2 [mm] | - | 7.0 | 7.0 | 4.0 | 4.0 | 4.0 | 4.0 | 4.0 | 4.0 |
| S1/L1, S2/L1 | - | - | 0.51 | 0.59 | 0.59 | 0.59 | 0.59 | 0.59 | 0.59 |
| W1/W2 | - | 0.45 | 0.45 | 0.24 | 0.13 | 0.22 | 0.17 | 0.16 | 0.21 |
| L1/L2 | 0.40 | - | 0.40 | 0.20 | 0.20 | 0.20 | 0.20 | 0.20 | 0.20 |
| γ1, γ2 [°] (0 [°] ~ 180 [°]) | 180 | 90 | 90 | 150 | 150 | 120 | 150 | 148 | 125 |
| Gradual decrease in sipe depth | No | No | No | No | No | No | Present | Present | Present |
| Uneven wear resistance performance (heel and toe wear resistance) | 100 | 95 | 95 | 96 | 100 | 100 | 115 | 114 | 112 |
| Sipe edge cracking resistance performance | 100 | 100 | 100 | 102 | 102 | 102 | 115 | 114 | 111 |

FIG. 8a

| | Working Example 4 | Working Example 5 | Working Example 6 | Working Example 7 | Working Example 8 | Working Example 9 | Working Example 10 | Working Example 11 | Working Example 12 |
|---|---|---|---|---|---|---|---|---|---|
| Number of sipe flex points | 2 | 2 | 2 | 2 | 2 | 2 | 2 | 2 | 2 |
| $\alpha$ [°] (0 [°] ~ 90 [°]) | 5 | 5 | 5 | 5 | 5 | 5 | 5 | 5 | 5 |
| $\beta 1, \beta 2$ [°] (0 [°] ~ 90 [°]) | 45 | 35 | 35 | 45 | 45 | 35 | 35 | 45 | 35 |
| D1/D2 | 0.10 | 0.15 | 0.85 | 0.50 | 0.50 | 0.50 | 0.50 | 0.50 | 0.50 |
| S1, S2 [mm] | 4.0 | 4.0 | 4.0 | 2.0 | 4.0 | 2.5 | 6.0 | 6.5 | 3.4 |
| S1/L1, S2/L1 | 0.59 | 0.59 | 0.59 | 0.29 | 0.59 | 0.37 | 0.88 | 0.96 | 0.50 |
| W1/W2 | 0.20 | 0.17 | 0.17 | 0.11 | 0.20 | 0.11 | 0.24 | 0.32 | 0.15 |
| L1/L2 | 0.20 | 0.20 | 0.20 | 0.20 | 0.20 | 0.20 | 0.20 | 0.20 | 0.20 |
| $\gamma 1, \gamma 2$ [°] (0 [°] ~ 180 [°]) | 140 | 150 | 150 | 140 | 140 | 150 | 150 | 140 | 150 |
| Gradual decrease in sipe depth | Present | Present | Present | Present | Present | Present | Present | Present | Present |
| Uneven wear resistance performance (heel and toe wear resistance) | 113 | 110 | 110 | 112 | 114 | 112 | 112 | 110 | 113 |
| Sipe edge cracking resistance performance | 113 | 115 | 115 | 110 | 113 | 111 | 115 | 113 | 113 |

FIG. 8b

| | Working Example 13 | Working Example 14 | Working Example 15 | Working Example 16 | Working Example 17 | Working Example 18 | Working Example 19 | Working Example 20 |
|---|---|---|---|---|---|---|---|---|
| Number of sipe flex points | 2 | 2 | 2 | 2 | 2 | 2 | 2 | 2 |
| $\alpha$ [°] (0 [°] ~ 90 [°]) | 5 | 5 | 5 | 5 | 5 | 10 | 0 | 5 |
| $\beta1, \beta2$ [°] (0 [°] ~ 90 [°]) | 35 | 35 | 35 | 35 | 45 | 45 | 35 | 35 |
| D1/D2 | 0.50 | 0.50 | 0.50 | 0.50 | 0.50 | 0.50 | 0.50 | 0.50 |
| S1, S2 [mm] | 4.8 | 4.0 | 4.0 | 4.0 | 4.0 | 4.0 | 4.0 | 4.0 |
| S1/L1, S2/L1 | 0.70 | 0.29 | 1.18 | 0.39 | 0.34 | 0.59 | 0.59 | 0.59 |
| W1/W2 | 0.19 | 0.19 | 0.16 | 0.16 | 0.22 | 0.22 | 0.15 | 0.17 |
| L1/L2 | 0.20 | 0.40 | 0.10 | 0.30 | 0.35 | 0.20 | 0.20 | 0.20 |
| $\gamma1, \gamma2$ [°] (0 [°] ~ 180 [°]) | 150 | 150 | 150 | 150 | 140 | 145 | 145 | 150 |
| Gradual decrease in sipe depth | Present | Present | Present | Present | Present | Present | Present | No |
| Uneven wear resistance performance (heel and toe wear resistance) | 114 | 109 | 111 | 109 | 108 | 111 | 113 | 115 |
| Sipe edge cracking resistance performance | 115 | 115 | 115 | 115 | 113 | 113 | 114 | 110 |

PNEUMATIC HEAVY-DUTY TIRE HAVING CIRCUMFERENTIAL REINFORCING LAYER AND SIPES

TECHNICAL FIELD

The present invention relates to a pneumatic tire, and more specifically, to a pneumatic tire by which uneven wear resistance can be improved.

BACKGROUND OF THE INVENTION

In recent years, pneumatic tires have been provided with a circumferential reinforcing layer in a belt layer in order to suppress radial growth of tires and suppress uneven wear (in particular, step wear in a shoulder land portion). The technology described in Japanese Unexamined Patent Application Publication No. 2009-73337A is known as a conventional pneumatic tire that is configured in this manner.

On the other hand, in pneumatic tires with a block pattern, there is also the issue that heel and toe wear in the blocks should be suppressed. Also, in pneumatic tires with a rib pattern, there is the issue that railway wear in the ribs should be suppressed.

SUMMARY

The present technology provides a pneumatic tire whereby uneven wear resistance can be enhanced. The pneumatic tire according to the present invention comprises: a belt layer that includes a circumferential reinforcing layer; a plurality of circumferential main grooves; and a plurality of land portions partitioned by the circumferential main grooves. In such a pneumatic tire, the land portions above the circumferential reinforcing layer have at least one sipe, the sipes have a bent shape with two flex points P1, P2 in a plan view, and have a closed structure with two end points Q1, Q2 that terminate within the land portion, an angle α between a line that connects the flex points P1, P2 and the tire circumferential direction is within a range such that $0° \leq \alpha \leq 10°$, and an angle β1 between a line that connects the flex point P1 and an end point Q1 and the tire circumferential direction, and an angle β2 between a line that connects the flex point P2 and an end point Q2 and the tire circumferential direction are within a range such that $35° \leq \beta1 \leq 55°$ and $35° \leq \beta2 \leq 55°$.

In the pneumatic tire according to the present invention, the land portions above the circumferential reinforcing layer have the sipe, so the ground contact pressure of the land portions is reduced, and uneven wear of the land portions (heel and toe wear of blocks, railway wear of the rib) is suppressed. This has the advantage that the uneven wear resistance performance of the tire is improved. Also, the sipe has a bent shape, and the angles of inclination α, β1, and β2 with respect to the tire circumferential direction of the center portion and the end portions thereof are made appropriate, so when turning or when braking/driving, the stress concentrations at the end points Q1, Q2 of the sipe are reduced. As a result, the occurrence of cracking originating at the end points Q1, Q2 of the sipe is suppressed, and this has the advantage that the sipe edge cracking resistance performance of the tire is improved.

BRIEF DESCRIPTION OF THE DRAWINGS

FIGS. 8a-8c include a table showing the results of performance testing of pneumatic tires according to the embodiment of the present invention.

DETAILED DESCRIPTION

The present invention is described below in detail with reference to the accompanying drawing. However, the present invention is not limited to these embodiments. Moreover, constituents of the embodiment which can possibly or obviously be substituted while maintaining consistency with the present invention are included. Furthermore, the multiple modified examples described in the embodiment can be combined as desired within a scope apparent to a person skilled in the art.

Pneumatic Tire

Figure 1:
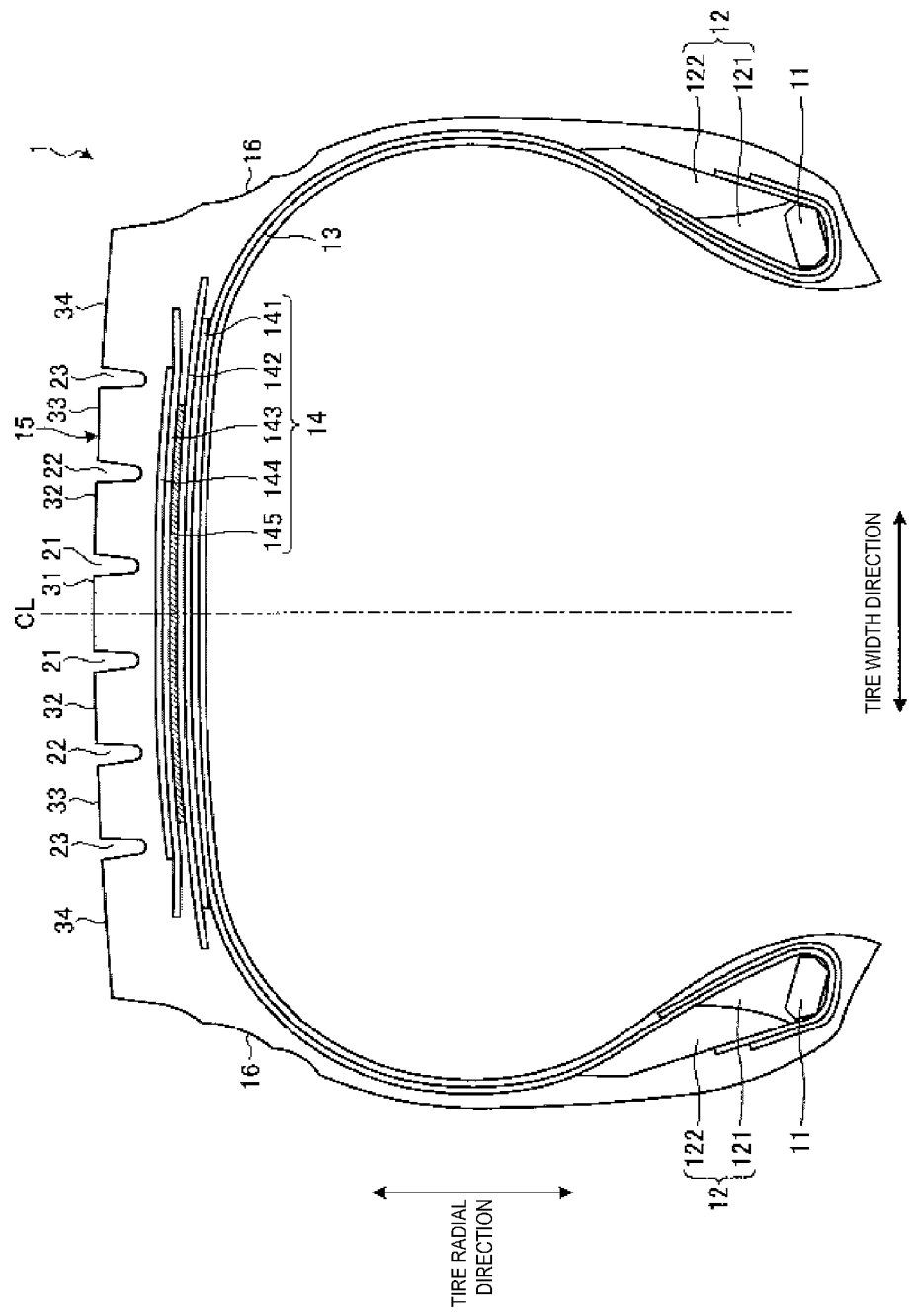
FIG. 1 is a cross-sectional view in a tire meridian direction illustrating a pneumatic tire according to an embodiment of the present invention.

FIG. 1 is a cross-sectional view in a tire meridian direction illustrating a pneumatic tire 1 according to an embodiment of the present invention. This drawing illustrates a radial tire for heavy loads that is mounted on the trucks and buses for long distance transport as an example of the pneumatic tire 1.

The pneumatic tire 1 includes a pair of bead cores 11,11, a pair of bead fillers 12,12, a carcass layer 13, a belt layer 14, tread rubber 15, and a pair of side wall rubbers 16,16 (see FIG. 1). The pair of bead cores 11,11 have annular structures and constitute cores of left and right bead portions. The pair of bead fillers 12,12 are formed from a lower filler 121 and an upper filler 122, and are disposed on a periphery of each of the pair of bead cores 11,11 in a tire radial direction so as to reinforce the bead portions. The carcass layer 13 has a single-layer structure, and stretches between the left and right bead cores 11 and 11 in toroidal form, forming a framework for the tire. Additionally, both end portions of the carcass layer 13 are folded toward an outer side in a tire width direction so as to envelop the bead cores 11 and the bead fillers 12, and fixed. The belt layer 14 is formed from a plurality of belt plies 141 to 145 that are laminated, and the belt layer 14 is disposed on the periphery of the carcass layer 13 in the tire radial direction. The tread rubber 15 is disposed on the periphery of the carcass layer 13 and the belt layer 14 in the tire radial direction, and forms a tire tread. The pair of side wall rubbers 16,16 is disposed on each outer side of the carcass layer 13 in the tire width direction, so as to form left and right side wall portions of the tire.

In this embodiment, the pneumatic tire 1 has a left-right symmetric internal structure centered on the tire equatorial plane CL.

Figure 2:
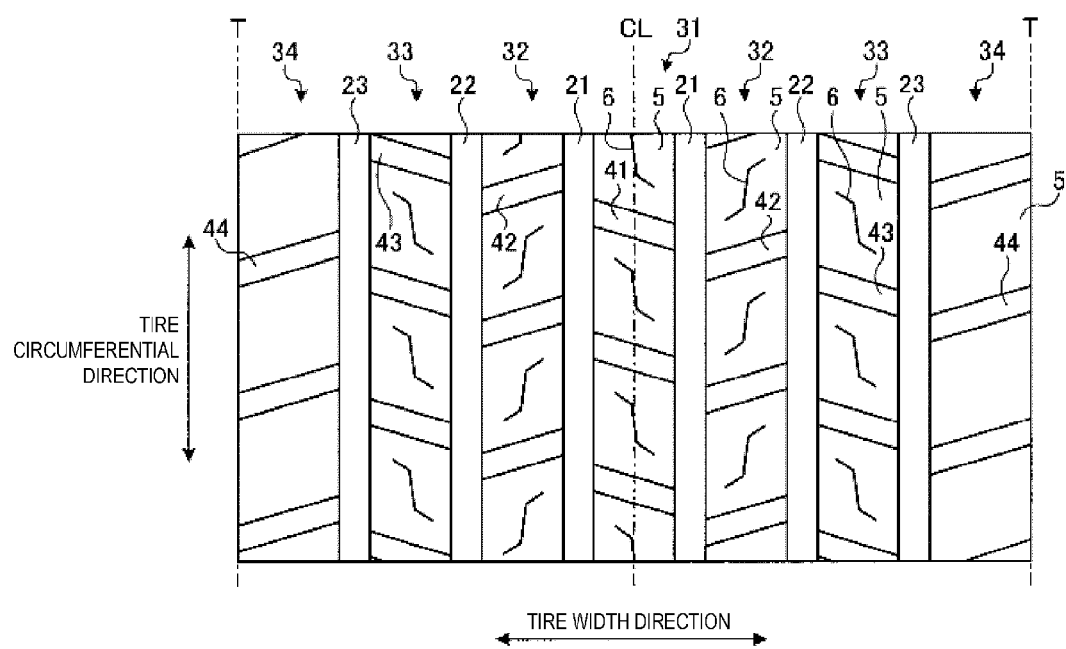
FIG. 2 is a plan view illustrating a tread pattern of the pneumatic tire depicted in FIG. 1.

FIG. 2 is a plan view illustrating a tread pattern of the pneumatic tire 1 depicted in FIG. 1.

The pneumatic tire 1 includes a plurality of circumferential main grooves 21 to 23 extending in the tire circumferential direction; and a plurality of land portions 31 to 34 partitioned by the circumferential main grooves 21 to 23 in the tread portion. Additionally, each of the land portions 31 to 34 has a plurality of lug grooves 41 to 44, respectively, extending in the tire width direction. As a result of the lug grooves 41 to 44, each of the land portions 31 to 34 is partitioned in the tire circumferential direction, to form a block pattern.

In the configuration illustrated in FIG. 2, the pneumatic tire 1 has six circumferential main grooves 21 to 23, five rows of center land portions 31 to 33, and a pair of left and right shoulder land portions 34, 34. Additionally, all of the land portions 31 to 34 have the plurality of lug grooves 41 to 44, respectively. Also, each of the lug grooves 41 to 44 is a slanting lug groove, having an open structure that crosses the land portions 31 to 34, and is disposed at predetermined intervals in the tire circumferential direction. In this way, all the land portions 31 to 34 become rows of blocks. However, the configuration is not limited thereto, and some or all of the land portions 31 to 34 may be continuous ribs in the tire circumferential direction (not illustrated on the drawings).

Also, in the configuration illustrated in FIG. 2, the circumferential main grooves 21 to 23 are straight grooves, but the configuration is not limited thereto, and the circumferential main grooves 21 to 23 may be zigzag grooves (not illustrated on the drawings).

Figure 3:
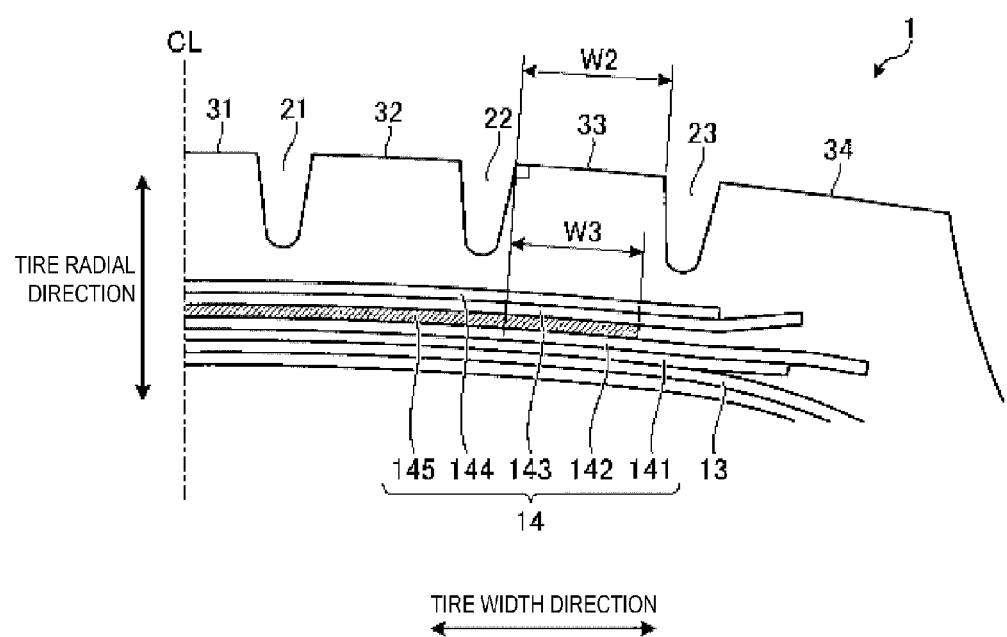
FIG. 3 is an explanatory view illustrating a shoulder portion of the pneumatic tire depicted in FIG. 1.
Figure 4:
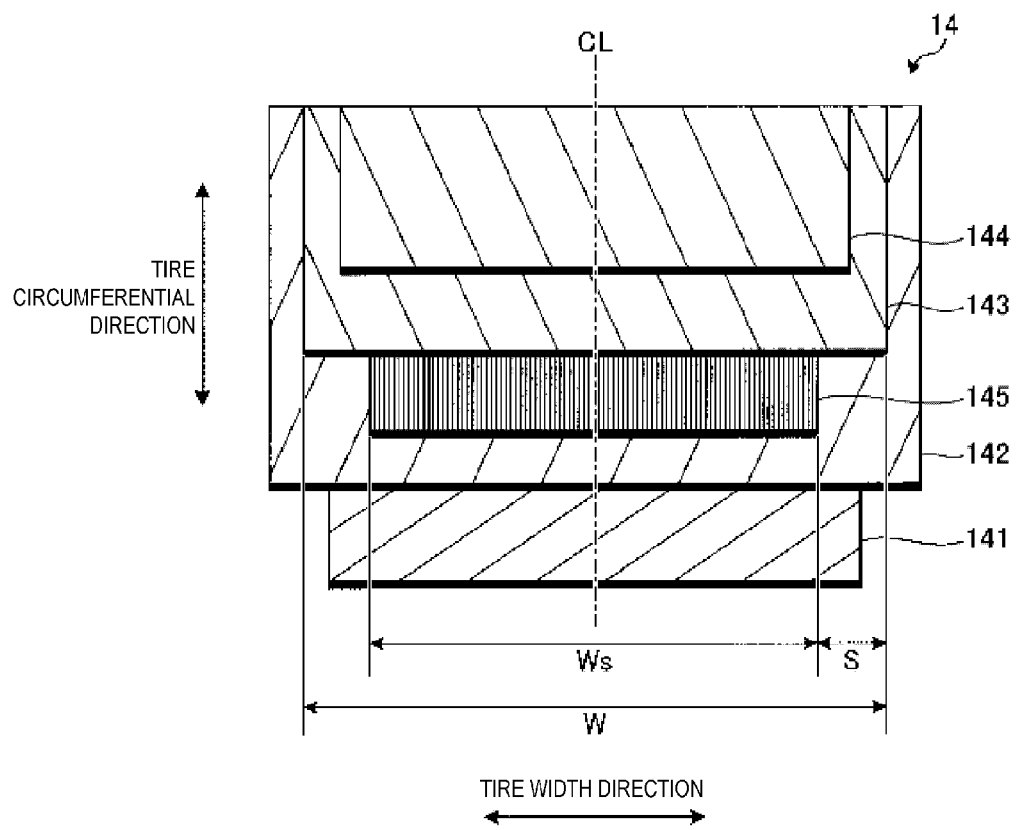
FIG. 4 is an explanatory view illustrating a belt layer of the pneumatic tire depicted in FIG. 1.

FIG. 3 is an explanatory view illustrating the shoulder portion of the pneumatic tire 1 depicted in FIG. 1. FIG. 4 is an explanatory view illustrating the belt layer 14 of the pneumatic tire 1 depicted in FIG. 1. In these drawings, FIG. 3 illustrates a region on one side of the tread portion demarcated by the tire equatorial plane CL, and FIG. 4 illustrates the laminated structure of the belt layer 14.

Also, the carcass layer 13 is constituted by a plurality of carcass cords formed from steel or organic fibers (e.g. nylon, polyester, rayon, or the like) covered by a coating rubber and subjected to a rolling process, and has a carcass angle (inclination angle of the carcass cord in a fiber direction with respect to the tire circumferential direction), as an absolute value, of not less than 85° and not more than 95°.

The belt layer 14 is formed by laminating a large angle belt 141, a pair of cross belts 142, 143, a belt cover 144, and a circumferential reinforcing layer 145, wound around the periphery of the carcass layer 13 (see FIG. 3).

The large angle belt 141 is constituted by a plurality of belt cords formed from steel or organic fibers covered by a coating rubber and subjected to a rolling process, and has a belt angle (inclination angle of the belt cords in a fiber direction with respect to the tire circumferential direction), as an absolute value, of not less than 40° and not more than 60°. Also, the large angle belt 141 is disposed laminated on the outer side in the tire radial direction of the carcass layer 13.

The pair of cross belts 142, 143 is constituted by a plurality of belt cords formed from steel or organic fibers covered by a coating rubber and subjected to a rolling process, and has a belt angle, as an absolute value, of not less than 10° and not more than 30°. Further, each of the pair of cross belts 142, 143 has a belt angle denoted with a mutually different symbol, and the belts are laminated so as to intersect each other in the belt cord fiber directions (crossply structure). In the following description, the cross belt 142 positioned on the inner side in the tire radial direction is referred to as "inner-side cross belt", and the cross belt 143 positioned on the outer side in the tire radial direction is referred to as "outer-side cross belt". Three or more cross belts may be provided laminated (not illustrated on the drawings). Also, the pair of cross belts 142, 143 is disposed laminated on the outer side in the tire radial direction of the large angle belt 141.

The belt cover 144 is constituted by a plurality of belt cords formed from steel or organic fibers covered by a coating rubber and subjected to a rolling process, and has a belt angle, as an absolute value, of not less than 10° and not more than 45°. Also, the belt cover 144 is disposed laminated on the outer side in the tire radial direction of the cross belts 142, 143. In this embodiment, the belt cover 144 has the same belt angle as the outer-side cross belt 143, and is disposed in the outermost layer of the belt layer 14.

The circumferential reinforcing layer 145 is constituted by belt cords formed from a rubber coated steel wire wound spirally at an angle with respect to the tire circumferential direction within a range of ±5°. Also, the circumferential reinforcing layer 145 is interposed between the pair of cross belts 142, 143. Also, the circumferential reinforcing layer 145 is disposed on the inner side in the tire width direction from the left and right edges of the pair of cross belts 142, 143. Specifically, the circumferential reinforcing layer 145 is formed by winding one or a plurality of wires in a spiral manner around the outer periphery of the inner-side cross belt 142. The circumferential reinforcing layer 145 improves the tire durability by strengthening the stiffness in the tire circumferential direction.

In the pneumatic tire 1, the belt layer 14 may have an edge cover (not illustrated on the drawings). Normally, the edge cover is constituted by a plurality of belt cords formed from steel or organic fibers covered by a coating rubber and subjected to a rolling process, and has a belt angle, as an absolute value, of not less than 0° and not more than 5°. Also, the edge cover is disposed on the outer side in the tire radial direction of the left and right edges of the outer-side cross belt 143 (or the inner-side cross belt 142). The edge covers improve the uneven wear resistance performance of the tire by reducing the difference in radial growth between the center area and the shoulder area of the tread portion, by exhibiting a band effect.

Circumferential Reinforcing Layer

Also, in the pneumatic tire 1, the belt cords from which the circumferential reinforcing layer 145 is configured are steel wire, and preferably, the number of ends of the circumferential reinforcing layer 145 is not less than 17 ends/50 mm and not more than 30 ends/50 mm. Also, preferably, the diameter of the belt cord is not less than 1.2 mm and not more than 2.2 mm. In a configuration in which the belt cords are formed from a plurality of cords twisted together, the belt cord diameter is measured as the diameter of a circle that circumscribes the belt cord. Also, in the pneumatic tire 1, the circumferential reinforcing layer 145 is configured by winding a single steel wire in a spiral manner. However, the configuration is not limited thereto, and the circumferential reinforcing layer 145 may be configured from a plurality of wires wound spirally around side-by-side to each other (multiple winding structure). In this case, preferably, the number of wires is 5 or less. Also, preferably, the width of winding per unit when 5 wires are wound in multiple layers is 12 mm or less. In this way, a plurality (not less than 2 and not more than 5) of wires can be wound properly while inclined with respect to the tire circumferential direction in the range of ±5°.

Also, in the pneumatic tire 1, (a) the elongation of the belt cords from which the circumferential reinforcing layer 145 is configured when they are components (when they are material prior to forming the green tire) when subjected to a tensile load of 100 N to 300 N is preferably not less than 1.0% and not more than 2.5%. Also, (b) the elongation of the belt cords of the circumferential reinforcing layer 145 when in the tire (the state when taken from the tire product) when subjected to a tensile load of 500 N to 1000 N is preferably not less than 0.5% and not more than 2.0%. The belt cords (high elongation steel wire) have a good elongation ratio when a low load is applied compared with normal steel wire, so they have the property that they can withstand the loads that are applied. Therefore, in the case of (a) above, it is possible to improve the durability of the circumferential reinforcing layer 145 during manufacture, and in the case of (b) above, it is possible to improve the durability of the circumferential reinforcing layer 145 when the tire is used, and these points are desirable.

The elongation of the belt cords is measured in accordance with JIS G3510.

Also, preferably, a width Ws of the circumferential reinforcing layer 145 is within the range such that $0.6 \leq Ws/W$. The width Ws of the circumferential reinforcing layer 145 when the circumferential reinforcing layer 145 has a divided structure (not illustrated on the drawings) is the sum of the widths of each divided portion.

Also, in the configuration illustrated in FIG. 4, the circumferential reinforcing layer 145 is disposed on the inner side in the tire width direction from the left and right edge portions of the narrower cross belt 143 of the pair of cross belts 142, 143. Also, preferably the width W of the narrower cross belt 143 and a distance S from the edge portion of the circumferential reinforcing layer 145 to the edge portion of the narrower cross belt 143 are in the range $0.03 \leq S/W$. This point is the same even if the circumferential reinforcing layer 145 has a configuration with a divided structure (not illustrated on the drawings). The width W and the distance S are measured as distances in the tire width direction when viewed as a cross-section from the tire meridian direction. Also, there is no upper limit to the value of S/W in particular, but it is restricted by the relationship of the width Ws of the circumferential reinforcing layer 145 and the width W of the narrower cross belt 143.

Also, preferably, the width Ws of the circumferential reinforcing layer 145 relative to the tire developed width TDW (not illustrated on the drawings) is in the range such that $0.65 \leq Ws/TDW \leq 0.80$. The tire developed width TDW is the linear distance in a development view between the two ends of the tread-patterned portion of the tire assembled on a standard rim to which a regular inner pressure is applied and no load is applied.

Also, in the configuration illustrated in FIG. 3, the circumferential reinforcing layer 145 is interposed between the pair of cross belts 142, 143 (see FIG. 3). However, the configuration is not limited thereto, and the circumferential reinforcing layer 145 may be disposed on the inner side of the pair of cross belts 142, 143. For example, the circumferential reinforcing layer 145 may be disposed (1) between the large angle belt 141 and the inner-side cross belt 142, or (2) between the carcass layer 13 and the large angle belt 141 (not illustrated on the drawings).

Sipes of the Blocks

In recent years, pneumatic tires have been provided with a circumferential reinforcing layer in a belt layer in order to suppress radial growth of tires and suppress uneven wear (in particular, step wear) in shoulder land portions.

In this configuration, the stiffness in the tire circumferential direction is increased at the land portions above the circumferential reinforcing layer, so the deformation is reduced. Therefore, the ground contact pressure of the land portions is increased, so the load acting on the land portions is increased during turning and braking/driving. Therefore, there is the issue that uneven wear can easily occur in the land portions. This uneven wear in blocks is, for example, heel and toe wear, and in ribs is, for example, railway wear.

Therefore, in the pneumatic tire 1, the following configuration is adopted in order to suppress uneven wear in the land portions.

Figure 5:
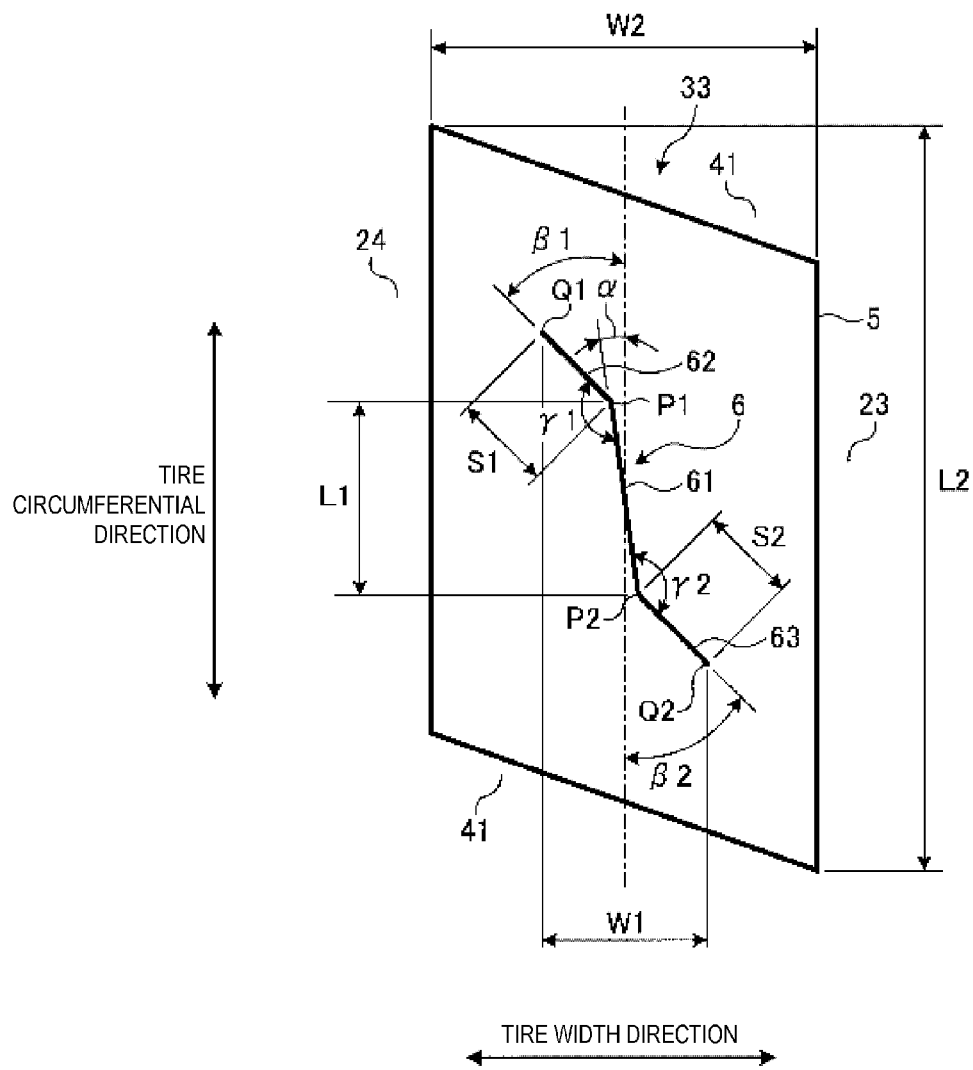
FIG. 5 is a plan view illustrating a sipe of the pneumatic tire depicted in FIG. 1.
Figure 6:
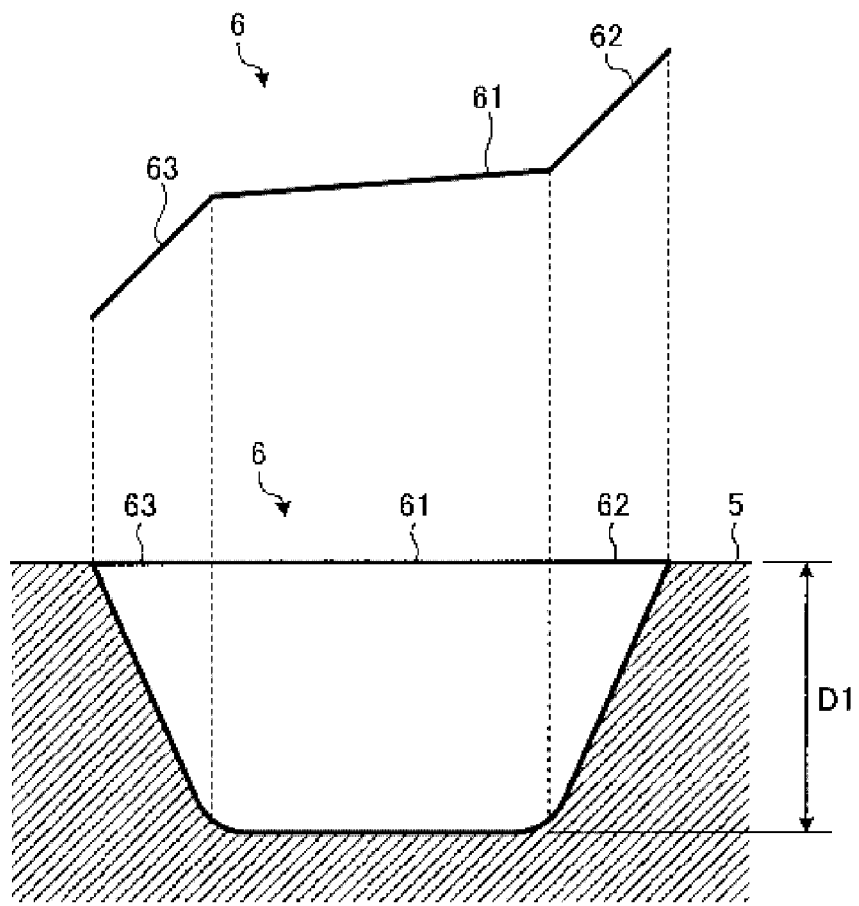
FIG. 6 is an explanatory view illustrating a sipe of the pneumatic tire depicted in FIG. 1.

FIG. 5 is a plan view illustrating a sipe 6 of the pneumatic tire 1 depicted in FIG. 1, and FIG. 6 is an explanatory view illustrating a sipe 6 of the pneumatic tire 1 depicted in FIG. 1.

Figure 7:
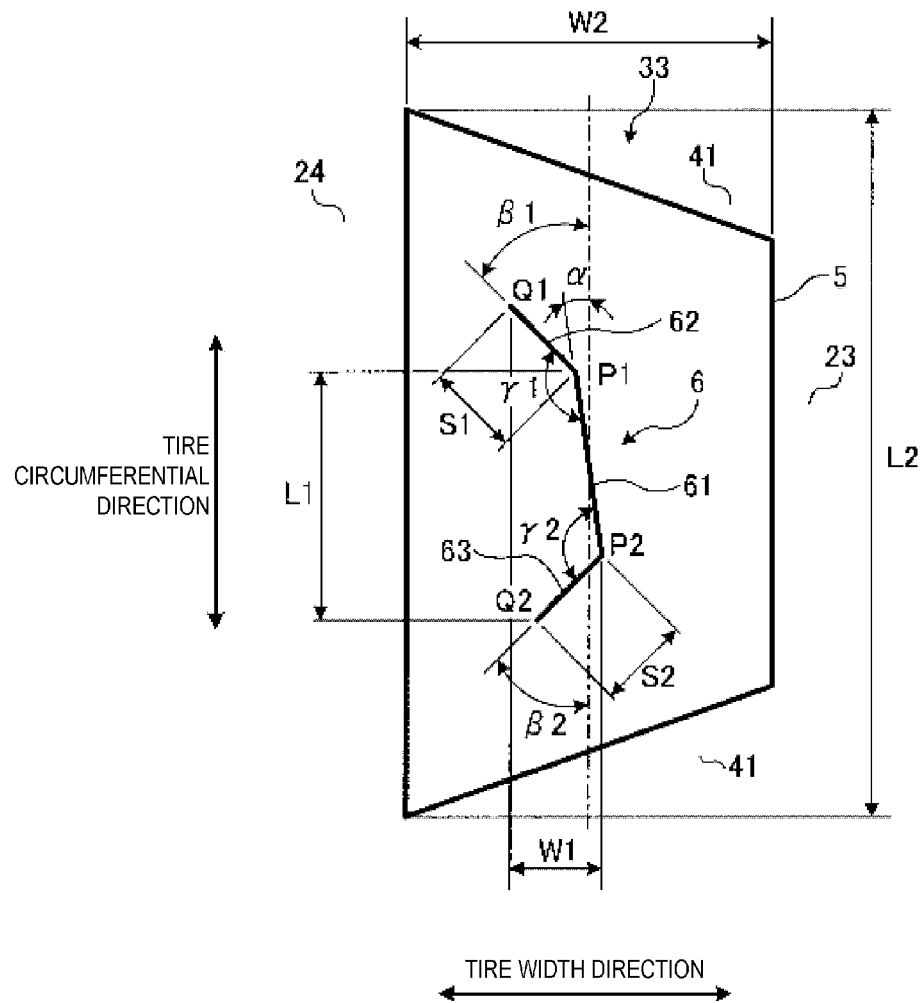
FIG. 7 is a plan view illustrating a sipe of a modified example of the pneumatic tire depicted in FIG. 1.

FIG. 7 is a plan view illustrating a sipe 6 of a modified example of the pneumatic tire 1 depicted in FIG. 1. In these drawings, FIG. 5 illustrates a block 5 alone, and its sipe 6. Also, as one example, FIG. 5 illustrates a block 5 of the land portion 33 partitioned by the outermost circumferential main groove 24 and the circumferential main groove 23 on the inner side thereof. Also, FIG. 6 illustrates a relationship between the planar form of the sipe 6 and the sipe depth D1.

In the pneumatic tire 1, the land portions 31 to 33 above the circumferential reinforcing layer 145 have at least one sipe 6 (see FIGS. 2 and 3).

For example, in the configuration illustrated in FIGS. 2 and 3, 5 rows of land portions 31 to 33 are disposed above the circumferential reinforcing layer 145. Also, these land portions 31 to 33 each have a plurality of lug grooves 41 to 43 disposed at predetermined intervals in the tire circumferential direction, so they are rows of blocks. Also, each block 5 of these land portions 31 to 33 has a single sipe 6.

If the end portion of the circumferential reinforcing layer 145 is below the land portion 33, and the width W2 of the road contact surface of the land portion 33 and the lap width W3 of the circumferential reinforcing layer 145 with respect to the road contact surface of the land portion 33 have a relationship such that $0.50 \leq W3/W2$ when viewed as a cross-section from the tire meridian direction, the land portion 33 can be said to be above the circumferential reinforcing layer 145 (see FIG. 3). Also, when the edge of the land portion 33 has a concavoconvex shape such as a configuration in which the circumferential main grooves 21 through 23 have a zigzag shape, and a configuration in which the land portions 31 to 34 have notches on the edges (not illustrated on the drawings), the width W2 of the road contact surface of the land portions 31 to 34 is measured based on the center point when the edges of the land portions 31 to 34 are projected in the tire circumferential direction. Also, a single block 5 may have a plurality of sipes (not illustrated on the drawings). Also, in a configuration with rib shaped land portions 31 to 33, each of the land portions 31 to 33 may have a plurality of sipes 6 aligned in the tire circumferential direction (not illustrated on the drawings).

Also, in the pneumatic tire 1, the sipe 6 of each land portion 31 to 33 has a closed structure having a bent shape with two flex points P1 and P2 in a plan view of the land portions 31 to 33, in which the two end points Q1, Q2 terminate within the land portions 31 to 33 (see FIG. 5).

For example, in the configuration illustrated in FIG. 5, the sipe 6 extends at an inclination with respect to the tire circumferential direction in a plan view of the block 5. Also, the sipe 6 has the bent shape that includes a center portion 61 that connects two end portions 62, 62 (the parts that include the ends of the sipe). Also, the center portion 61 of the sipe 6 is disposed in the center of the block 5, inclined at an angle $\alpha$ with respect to the tire circumferential direction. Also, the two end portions 62, 63 of the sipe 6 are inclined in the same direction with respect to the direction of inclination of the center portion 61. Also, the block 5 has a diamond planar form, and the sipe 6 extends while being bent in the long diagonal direction of the diamond shape. In this way, the sipe 6 is disposed along the shape of the block 5.

In this case, the angle $\alpha$ between the line that connects the flex points P1, P2 (the center portion 61) and the tire circumferential direction is within the range such that $0° \leq \alpha \leq 10°$. Also, the angle $\beta1$ between the line connecting the flex point P1 and the end point Q1 (first end portion 62) and the tire circumferential direction, and the angle $\beta2$ between the line connecting the flex point P2 and the end point Q2 (second end portion 63) and the tire circumferential direction are within the range such that $35° \leq \beta1 \leq 55°$ and $35° \leq \beta2 \leq 55°$.

In this configuration, the land portions 31 to 33 above the circumferential reinforcing layer 145 have the sipe 6, so the ground contact pressure of the land portions 31 to 33 is reduced, and uneven wear of the land portions 31 to 33 is suppressed. Specifically, in the case that the land portions 31 to 33 are rows of blocks, heel and toe wear of the block 5 is suppressed, and in the case that the land portions 31 to 33 are ribs, railway wear is suppressed.

Also, the sipe 6 has a bent shape, and the angles of inclination $\alpha$, $\beta1$, and $\beta2$ with respect to the tire circumferential direction of the center portion 61 and the end portions 62, 63 thereof are made appropriate, so, when turning or when braking/driving, the stress concentrations at the end points Q1, Q2 of the sipe 6 are reduced. As a result, the occurrence of cracking that originates at the end points Q1, Q2 of the sipe 6 is suppressed.

Specifically, the angle $\alpha$ is set to be within the range such that $0° \leq \alpha \leq 10°$, so the ground contact pressure can be made uniform while maintaining the stiffness of the land portions 31 to 33. Also, the angles $\beta1$, $\beta2$ are set to be within the range such that $35° \leq \beta1$ and $35° \leq \beta2$, so the stress concentrations at the end points Q1, Q2 of the sipe 6 when turning are reduced, and the angles $\beta1$, $\beta2$ are set to be within the range such that $\beta1 \leq 55°$ and $\beta2 \leq 55°$, so the stress concentrations at the end points Q1, Q2 of the sipe 6 when braking/driving are reduced.

In the configuration illustrated in FIG. 5, the center portion 61 of the sipe 6 is slanted in the same direction (to the left side towards the upper part of the plane of the paper in FIG. 5) with respect to the lug groove 41 that partitions the block 5. Also, the two end portions 62, 63 of the sipe 6 are inclined in the same direction with respect to the center portion 61, and are both inclined in the same direction. In this configuration, in the configuration in which the land portions 31 to 33 have diamond shaped blocks 5 (see FIG. 2), preferably the sipe 6 is disposed along the shape of the block 5.

However, the configuration is not limited thereto, and the two end portions 62, 63 of the sipe 6 may be inclined in different directions (see FIG. 7). For example, in the configuration illustrated in FIG. 7, the center portion 61 of the sipe 6 and the first end portion 62 may be inclined to the left side towards the upper part of the plane of the paper, and the second end portion 63 may be inclined to the right side towards the upper part of the plane of the paper. In this configuration, for example, in the configuration in which the land portions 31 to 33 have trapezoidal shaped blocks 5, preferably the sipe 6 can be disposed along the shape of the block 5.

Also, the two end portions 62, 63 and the center portion 61 of the sipe 6 may be bent in mutually different directions (not illustrated on the drawings). For example, in the configuration illustrated in FIG. 5, the center portion 61 of the sipe 6 is inclined to the left side towards the upper part of the plane of the paper, and the two end portions 62, 63 of the sipe 6 may be inclined to the right side towards the upper part of the plane of the paper.

Also, in the configuration illustrated in FIG. 2, the blocks 5 have a diamond planar form, but this is not a limitation, and the blocks 5 may have an arbitrary planar form (not illustrated on the drawings).

Also, in the pneumatic tire 1, the length S1 of the line connecting the flex point P1 and the end point Q1 and the length S2 of the line connecting the flex point P2 and the end point Q2 preferably are in the ranges such that $2.5$ mm $\leq S1 \leq 6.0$ mm and $2.5$ mm $\leq S2 \leq 6.0$ mm (see FIG. 5). By setting the lengths S1, S2 to be within the range such that $2.5$ mm $\leq S1$ and $2.5$ mm $\leq S2$, it is possible to ensure the lengths S1, S2 between the flex points P1, P2 where stress concentrations can easily occur and the end points Q1, Q2 of the sipe 6, so the occurrence of cracking can be effectively suppressed. Also, by setting the lengths S1, S2 to be within the range such that $S1 \leq 6.0$ mm and $S2 \leq 6.0$ mm, it is possible to ensure the stiffness of the blocks 5, and suppress uneven wear of the blocks 5.

Also, in the pneumatic tire 1, preferably the width W1 in the tire width direction of the sipe 6 and the width W2 in the tire width direction of the land portions 31 to 33 have a relationship such that $W1/W2 \leq 0.20$ (see FIG. 5). By setting the widths W1, W2 to have the relationship such that $W1/W2 \leq 0.20$, the width W1 of the sipe 6 is made appropriate, and uneven wear of the block 5 is suppressed.

The lower limit of W1/W2 is $0 \leq W1/W2$, but it is restricted by, for example, the lengths S1, S2 of the end portions 62, 63 of the sipe 6 and the inclination angles $\beta1$, $\beta2$, and the like.

Also, in the pneumatic tire 1, in the configuration in which the land portions 31 to 33 are formed from rows of blocks 5 aligned in the tire circumferential direction (see FIG. 2), the length L1 in the tire circumferential direction of the sipe 6 and the length L2 in the tire circumferential direction of the block 5 preferably have a relationship such that $0.10 \leq L1/L2 \leq 0.30$ (see FIG. 5). Here, the length L2 of the block 5 is measured on the block 5 having the sipe 6 with the length L1. In this configuration, by setting the lengths L1, L2 to have the relationship such that $0.10 \leq L1/L2$, the ground contact pressure is dispersed, and uneven wear of the block 5 is suppressed. Also, by setting the lengths L1, L2 to have the relationship such that $L1/L2 \leq 0.30$, the stiffness of the block 5 is ensured, so uneven wear of the block 5 is suppressed.

Also, in the configuration described above, preferably the lengths S1, S2 and the length L1 in the tire circumferential direction of the line connecting the flex points P1, P2 have a relationship such that $0.50 \leq S1/L1 \leq 0.70$ and $0.50 \leq S2/L1 \leq 0.70$.

Also, in the pneumatic tire 1, preferably the angle $\gamma1$ between the line that connects the flex points P1, P2 and the line that connects the flex point P1 and the end point Q1, and the angle $\gamma2$ between the line that connects the flex points P1, P2 and the line that connects the flex point P2 and the end point Q2 are within the ranges such that $145° \leq \gamma1 \leq 155°$ and $145° \leq \gamma1 \leq 155°$.

Also, in the pneumatic tire 1, preferably the maximum depth D1 of the sipe 6 and the maximum depth D2 of the circumferential main grooves (not illustrated on the drawings) have a relationship such that $0.15 \leq D1/D2 \leq 0.85$ (see FIG. 6). Here, the maximum depth D2 of the circumferential main groove is measured on the left and right circumferential main grooves of the block 5 having the sipe 6 with the maximum depth D1. The groove depth of the circumferential main grooves 21 to 23 is normally set deeper the further to the outer side in the tire width direction. Also, in the pneumatic tire 1, preferably the depth D1 of the sipe 6 gradually decreases towards the end points Q1, Q2 (see FIG. 6). For example, in the configuration illustrated in FIG. 6, the depth D1 of the sipe 6 is constant in the center portion 61, and in the left and right end portions 62, 63, the depth D1 becomes gradually shallower towards the end points Q1, Q2.

Each of the dimensions $\alpha$, $\beta1$, $\beta2$, $\gamma1$, $\gamma2$, L1, L2, W1, W2, S1, S2 of the block 5 and the sipe 6 are measured with the tire assembled on a regular rim with the regular inner pressure applied, under no load conditions.

Here, "regular rim" refers to a "standard rim" defined by the Japan Automobile Tyre Manufacturers Association Inc.

(JATMA), a "design rim" defined by the Tire and Rim Association, Inc. (TRA), or a "measuring rim" defined by the European Tyre and Rim Technical Organisation (ETRTO). "Regular inner pressure" refers to "maximum air pressure" stipulated by JATMA, a maximum value in "tire load limits at various cold inflation pressures" defined by TRA, and "inflation pressures" stipulated by ETRTO. Note that "regular load" refers to "maximum load capacity" stipulated by JATMA, a maximum value in "tire load limits at various cold inflation pressures" defined by TRA, and "load capacity" stipulated by ETRTO. However, with JATMA, in the case of passenger car tires, the regular internal pressure is an air pressure of 180 kPa, and the regular load is 88% of the maximum load capacity.

Effect

As described above, the pneumatic tire 1 includes the belt layer 14 that includes the circumferential reinforcing layer 145 (see FIGS. 1, 3, and 4). Additionally, the pneumatic tire 1 includes the plurality of circumferential main grooves 21 to 23; and the plurality of land portions 31 to 34 partitioned and formed by the circumferential main grooves 21 to 23 (see FIG. 2). Also, the land portions 31 to 33 (in FIG. 5, the block 5) above the circumferential reinforcing layer 145 have at least one sipe 6. Also, the sipe 6 has a bent shape, in a plan view, with two flex points P1, P2, and has a closed structure with the two end points Q1, Q2 terminating within the land portions 31 to 33. Also, the angle α between the line that connects the flex points P1, P2 and the tire circumferential direction is within the range such that $0° \leq \alpha \leq 10°$. Also, the angle β1 between the line connecting the flex point P1 and the end point Q1 and the tire circumferential direction, and the angle β2 between the line connecting the flex point P2 and the end point Q2 and the tire circumferential direction are within the range such that $35° \leq \beta 1 \leq 55°$ and $35° \leq \beta 2 \leq 55°$.

In this configuration, the land portions 31 to 33 above the circumferential reinforcing layer 145 have the sipe 6 (see FIGS. 2 and 3), so the ground contact pressure of the land portions 31 to 33 is reduced, and uneven wear of the land portions 31 to 33 (heel and toe wear of blocks, railway wear of the rib) is suppressed. This has the advantage that the uneven wear resistance performance of the tire is improved. Also, the sipe 6 has a bent shape, and the angles of inclination α, β1, and β2 with respect to the tire circumferential direction of the center portion 61 and the end portions 62, 63 thereof are made appropriate (see FIG. 5), so, when turning or when braking/driving, the stress concentrations at the end points Q1, Q2 of the sipe 6 are reduced. As a result, the occurrence of cracking originating at the end points Q1, Q2 of the sipe 6 is suppressed, and this has the advantage that the sipe edge cracking resistance performance of the tire is improved.

Also, in the pneumatic tire 1, the maximum depth D1 of the sipe 6 and the maximum depth D2 (not illustrated on the drawings) of the left and right circumferential main grooves of the land portion having the sipe 6 (circumferential main grooves 22, 23 in FIG. 5) have a relationship such that $0.15 \leq D1/D2 \leq 0.85$ (see FIG. 6). As a result, the maximum depth D1 of the sipe 6 is made appropriate, and this has the advantage that the uneven wear resistance performance of the tire is improved.

Also, in the pneumatic tire 1, the length S1 of the line connecting the flex point P1 and the end point Q1 and the length S2 of the line connecting the flex point P2 and the end point Q2 are in the ranges such that 2.5 mm $\leq$ S1 $\leq$ 6.0 mm and 2.5 mm $\leq$ S2 $\leq$ 6.0 mm (see FIG. 5). As a result, the lengths S1, S2 of the end portions 62, 63 of the sipe 6 are made appropriate, and this has the advantage that the uneven wear resistance performance and the sipe edge cracking resistance performance are improved.

Also, in the pneumatic tire 1, the lengths S1, S2 and the length L1 in the tire circumferential direction of the line connecting the flex points P1, P2 have a relationship such that $0.50 \leq S1/L1 \leq 0.70$ and $0.50 \leq S2/L1 \leq 0.70$ (see FIG. 5). As a result, the lengths S1, S2 of the end portions 62, 63 of the sipe 6 are made appropriate, and this has the advantage that the uneven wear resistance performance is improved.

Also, in the pneumatic tire 1, the width W1 in the tire width direction of the sipe 6 and the width W2 in the tire width direction of the land portions 31 to 33 having the sipe 6 have a relationship such that $W1/W2 \leq 0.20$ (see FIG. 5). As a result, the width W1 of the sipe 6 is made appropriate, and this has the advantage that the uneven wear resistance performance of the tire is improved.

Also, in the pneumatic tire 1, the land portions 31 to 33 are formed from rows of blocks 5 aligned in the tire circumferential direction (see FIG. 2). Also, the length L1 in the tire circumferential direction of the line connecting the flex points P1, P2 of the sipe 6 and the length L2 in the tire circumferential direction of the block 5 that has the sipe 6 have a relationship such that $0.10 \leq L1/L2 \leq 0.30$ (see FIG. 5). As a result, the length L1 of the center portion 61 of the sipe 6 is made appropriate, and this has the advantage that the uneven wear resistance performance of the tire is improved.

Also, in the pneumatic tire 1, the angle γ1 between the line that connects the flex points P1, P2 and the line that connects the flex point P1 and the end point Q1, and the angle γ2 between the line that connects the flex points P1, P2 and the line that connects the flex point P2 and the end point Q2 are within the ranges such that $145° \leq \gamma 1 \leq 155°$ and $145° \leq \gamma 2 \leq 155°$ (see FIG. 5). As a result, the bend angles γ1, γ2 of the sipe 6 are made appropriate, and this has the advantage that the uneven wear resistance performance of the tire is improved.

Also, in the pneumatic tire 1, the depth D1 of the sipe 6 gradually decreases towards the end points Q1, Q2 (see FIG. 6). As a result, there is the advantage that the occurrence of cracking originating at the end points Q1, Q2 of the sipe 6 is suppressed.

Also, in the pneumatic tire 1, the two end portions 62, 63 of the sipe 6 are inclined in the same direction as the center portion 61 of the sipe 6 with respect to the tire circumferential direction (see FIG. 5).

Also, in the pneumatic tire 1, the belt layer 14 includes the large angle belt 141, the pair of cross belts 142, 143 disposed on the outer side in the tire radial direction of the large angle belt 141, the belt cover 144 disposed on the outer side in the tire radial direction of the pair of cross belts 142, 143, and the circumferential reinforcing layer 145 disposed between the pair of cross belts 142, 143, on the inner side in the tire radial direction of the pair of cross belts 142, 143, or on the inner side in the tire radial direction of the large angle belt 141 (see FIGS. 3 and 4). By applying the pneumatic tire 1 having this configuration, it is possible to obtain the significant advantage that the tire uneven wear resistance performance is improved.

Also, in the pneumatic tire 1, the belt cords from which the circumferential reinforcing layer 145 is configured are steel wire, and the number of ends of the circumferential reinforcing layer 145 is not less than 17 ends/50 mm and not more than 30 ends/50 mm.

Also, in the pneumatic tire 1, the elongation of the belt cords from which the circumferential reinforcing layer 145 is configured when they are components when subjected to a tensile load of 100 N to 300 N is not less than 1.0% and not more than 2.5%.

Also, in the pneumatic tire 1, the elongation of the belt cords from which the circumferential reinforcing layer 145 is configured when they are in the tire when subjected to a tensile load of 500 N to 1000 N is not less than 0.5% and not more than 2.0%.

Also, in the pneumatic tire 1, the circumferential reinforcing layer 145 is disposed on the inner side in the tire width direction from the left and right edge portions of the narrower cross belt 143 of the pair of cross belts 142, 143 (see FIG. 4). Also, the width W of the narrower cross belt 143 and the distance S from the edge portion of the circumferential reinforcing layer 145 to the edge portion of the narrower cross belt 143 are in the range such that $0.03 \leq S/W$. As a result, the positional relationship S/W of the edge portions of the cross belts 142, 143 and the edge portions of the circumferential reinforcing layer 145 is made appropriate, and this has the advantage that it is possible to reduce the strain that is produced in the rubber material around the circumferential reinforcing layer 145.

Also, in the pneumatic tire 1, the width W of the narrower cross belt 143 and the width Ws of the circumferential reinforcing layer 145 are within the range such that $0.60 \leq Ws/W$.

Also, in the pneumatic tire 1, the width Ws of the circumferential reinforcing layer 145 relative to the tire developed width TDW (not illustrated on the drawings) is in the range such that $0.65 \leq Ws/TDW \leq 0.80$. In this configuration, the width Ws and the tire developed width TDW are in the range such that $Ws/TDW \leq 0.80$, so the width Ws of the circumferential reinforcing layer 145 is made appropriate. This has the advantage that fatigue failure of the belt cords is suppressed at the end portion of the circumferential reinforcing layer 145. Also, the width Ws and the tire developed width TDW are in the range such that $0.65 \leq Ws/TDW$, this has the advantage that the ground contact shape of the tire is made appropriate, and the tire uneven wear resistance performance is increased.

Target of Application

It is preferable that the pneumatic tire 1 be applied for a heavy-duty tire. A heavy-duty tire has heavier loads during use compared with the tires for a passenger car. Also, the difference in diameter between the region where the circumferential reinforcing layer is disposed and the region on the outer side in the tire width direction increases, so uneven wear can easily occur in the shoulder land portion. Therefore, applying the present technology to heavy-duty tires leads to more significant uneven wear suppression effect.

Also, preferably, the pneumatic tire 1 is applied to a tire with an aspect ratio within the range not less than 40% and not more than 70%, in the state where the tire is assembled on a standard rim, the regular inner pressure is applied to the tire, and the regular load is applied. In addition, the pneumatic tire 1 as in this embodiment is preferably used as a pneumatic tire for heavy loads, such as buses or trucks and the like. In a tire having this aspect ratio (in particular, heavy-duty pneumatic tires for buses or trucks and the like), the ground contact shape can easily become hourglass shaped, so uneven wear can easily occur in the shoulder land portion. Therefore, by applying the pneumatic tire 1 to tires having this aspect ratio, it is possible to obtain a significant uneven wear suppression effect.

Also, preferably, the pneumatic tire 1 is applied to a tire having the tire ground contact edge T in the edge portion on the outer side in the tire width direction of the shoulder land portion 34, as illustrated in FIG. 2. In this configuration, uneven wear can easily occur in the edge portion of the shoulder land portion 34. Therefore, by applying the pneumatic tire 1 to tires having this configuration, it is possible to obtain a significant uneven wear suppression effect. In the configuration illustrated in FIG. 2, the tire ground contact edge T, the tread edge, and the edge portion of the shoulder land portion 34 coincide. Additionally, the "tire ground contact edge T" refers to the maximum width position in a tire axial direction of a contact surface between the tire and a flat plate in a configuration in which the tire is assembled on a regular rim, filled with regular inner pressure, placed perpendicularly to the flat plate in a static state, and loaded with a load corresponding to a regular load.

EXAMPLES

FIGS. 8a-8c include a table showing the results of performance testing of pneumatic tires according to embodiments of the present invention.

In the performance testing, a plurality of mutually differing pneumatic tires were evaluated for (1) uneven wear resistance performance and (2) sipe edge cracking resistance performance (see FIGS. 8a-8c). Also, pneumatic tires with a tire size 445/50R22.5 were assembled on a rim having a rim size of 22.5×14.00, and an air pressure of 900 kPa and a load of 4625 kg/tire were applied to these pneumatic tires. Also, the pneumatic tires were mounted on a 6×4 tractor and trailer test vehicle.

(1) In the evaluation of uneven wear resistance performance, a test vehicle was driven on an ordinary paved road for 30,000 km, and thereafter the amount of heel and toe wear of the blocks was measured (the difference in the amount of wear between the area of greatest wear and the area of least wear within a block). Evaluations were performed by indexing the measurement results with the Conventional Example as the standard score (100). In this evaluation, higher scores were preferable.

(2) In the evaluation of sipe edge cracking resistance performance, a test vehicle was driven on an ordinary paved road for 30,000 km, and thereafter the rate of occurrence of cracking in the edges of the sipes was measured. Evaluations were performed by indexing the measurement results with the Conventional Example as the standard score (100). In this evaluation, higher scores were preferable.

The pneumatic tires 1 according to Working Examples 1 to 20 had the configuration of FIGS. 1 to 5, with the land portions formed as rows of blocks. Also, the length L2 and the width W2 of the block 5 were L2=34 mm and W2=31 mm. Also, the maximum depth D2 of the circumferential main groove 23 was D2=20.0 mm.

The pneumatic tire of the Conventional Example had blocks with closed sipes with a linear form, in the configuration illustrated in FIGS. 1 to 3. Also, the sipes had a uniform sipe depth.

It is clear from test results that with the pneumatic tires 1 of Working Examples 1 to 20, the uneven wear resistance performance and the sipe edge cracking resistance performance were enhanced.

What is claimed is:

1. A pneumatic tire comprising: a belt layer that includes a circumferential reinforcing layer; a plurality of circumferential main grooves; and a plurality of land portions partitioned by the circumferential main grooves, wherein
the pneumatic tire is a heavy-duty tire,
the land portions above the circumferential reinforcing layer have at least one sipe,
the at least one sipe has a bent shape with two flex points P1, P2 in a plan view, and a closed structure with two end points Q1, Q2 that terminate within the land portion, an angle α between a line that connects the flex points P1, P2 and a tire circumferential direction is within a range such that 0°≤α≤10°, an angle β1 between a line connecting the flex point P1 and the end point Q1 and the tire circumferential direction, and an angle β2 between a line connecting the flex point P2 and the end point Q2 and the tire circumferential direction are within a range such that 35°≤β1≤55° and 35°≤β2≤55°, a length S1 of the line connecting the flex point P1 and the end point Q1, a length S2 of the line connecting the flex point P2 and the end point Q2, and a length L1 in the tire circumferential direction of the line connecting the flex points P1, P2 have a relationship such that 0.50≤S1/L1≤0.70 and 0.50≤S2/L1≤0.70, a width W1 in a tire width direction of the sipe and a width W2 in the tire width direction of the land portion having the sipe have a relationship such that W1/W2≤0.20, a depth D1 of the sipe gradually decreases towards the end points Q1, Q2, the circumferential reinforcing layer is disposed on an inner side in the tire width direction from left and right edge portions of a narrower cross belt of a pair of cross belts, and a width W of the narrower cross belt and a width Ws of the circumferential reinforcing layer are within a range such that 0.60≤Ws/W.

2. The pneumatic tire according to claim 1, wherein a maximum depth D1 of the sipe and a maximum depth D2 of left and right circumferential main grooves of the land portion having the sipe have a relationship such that 0.15≤D1/D2≤0.85.

3. The pneumatic tire according to claim 1, wherein a length S1 of the line connecting the flex point P1 and the end point Q1 and a length S2 of the line connecting the flex point P2 and the end point Q2 are in ranges such that 2.5 mm≤S1≤6.0 mm and 2.5 mm≤S2≤6.0 mm.

4. The pneumatic tire according to claim 1, wherein the land portions include a plurality of blocks aligned in a row in the tire circumferential direction, and the length L1 in the tire circumferential direction of the line connecting the flex points P1, P2 of the sipe and a length L2 in the tire circumferential direction of the block having the sipe have a relationship such that 0.10≤L1/L2≤0.30.

5. The pneumatic tire according to claim 1, wherein an angle γ1 between the line that connects the flex points P1, P2 and the line that connects the flex point P1 and the end point Q1, and an angle γ2 between the line that connects the flex points P1, P2 and the line that connects the flex point P2 and the end point Q2 are within ranges such that 145°≤γ1≤155° and 145°≤γ2≤155°.

6. The pneumatic tire according to claim 1, wherein the sipe has a bent shape formed by connecting a center portion to two end portions that include sipe end portions, and the two end portions are inclined in a same direction with respect to the tire circumferential direction as the center portion.

7. The pneumatic tire according to claim 1, wherein the belt layer includes a large angle belt, a pair of cross belts disposed on an outer side in a tire radial direction of the large angle belt, a belt cover disposed on the outer side in the tire radial direction of the pair of cross belts, and the circumferential reinforcing layer disposed between the pair of cross belts, on the inner side in the tire radial direction of the pair of cross belts, or on the inner side in the tire radial direction of the large angle belt.

8. The pneumatic tire according to claim 1, wherein belt cords from which the circumferential reinforcing layer is configured are steel wire, and the circumferential reinforcing layer has not less than 17 ends/50 mm and not more than 30 ends/50 mm.

9. The pneumatic tire according to claim 1, wherein elongation of belt cords of the circumferential reinforcing layer when they are components when subjected to a tensile load of 100 N to 300 N is not less than 1.0% and not more than 2.5%.

10. The pneumatic tire according to claim 1, wherein elongation of belt cords of the circumferential reinforcing layer when they are in the tire when subjected to a tensile load of 500 N to 1000 N is not less than 0.5% and not more than 2.0%.

11. The pneumatic tire according to claim 1, wherein the circumferential reinforcing layer is disposed on the inner side in the tire width direction from left and right edge portions of the narrower cross belt of the pair of cross belts, and a width W of the narrower cross belt and a distance S from the edge portion of the circumferential reinforcing layer to the edge portion of the narrower cross belt are within a range such that 0.03≤S/W.

12. The pneumatic tire according to claim 1, wherein the width Ws of the circumferential reinforcing layer relative to the tire developed width TDW is within a range such that 0.65≤Ws/TDW≤0.80.

13. The pneumatic tire according to claim 1 applied to a tire with an aspect ratio of 70% or less.

14. The pneumatic tire according to claim 1, wherein:
a maximum depth D1 of the sipe and a maximum depth D2 of left and right circumferential main grooves of the land portion having the sipe have a relationship such that 0.15≤D1/D2≤0.85; and a length S1 of the line connecting the flex point P1 and the end point Q1 and a length S2 of the line connecting the flex point P2 and the end point Q2 are in ranges such that 2.5 mm≤S1≤6.0 mm and 2.5 mm≤S2≤6.0 mm.

15. The pneumatic tire according to claim 1, wherein:
the land portions include a plurality of blocks aligned in a row in the tire circumferential direction;

the length L1 in the tire circumferential direction of the line connecting the flex points P1, P2 of the sipe and a length L2 in the tire circumferential direction of the block having the sipe have a relationship such that 0.10≤L1/L2≤0.30;

an angle γ1 between the line that connects the flex points P1, P2 and the line that connects the flex point P1 and the end point Q1, and an angle γ2 between the line that connects the flex points P1, P2 and the line that connects the flex point P2 and the end point Q2 are within ranges such that 145°≤γ1≤155° and 145°≤γ2≤155°; and the sipe has a bent shape formed by connecting a center portion to two end portions that include sipe end portions, and the two end portions are inclined in a same direction with respect to the tire circumferential direction as the center portion.

16. The pneumatic tire according to claim 1, wherein
belt cords from which the circumferential reinforcing layer is configured are steel wire, and the circumferential reinforcing layer has not less than 17 ends/50 mm and not more than 30 ends/50 mm;

elongation of the belt cords of the circumferential reinforcing layer when they are components when subjected to a tensile load of 100 N to 300 N is not less than 1.0% and not more than 2.5%;

the width Ws of the circumferential reinforcing layer relative to the tire developed width TDW is within a range such that 0.65≤Ws/TDW≤0.80; and the pneumatic tire is a tire with an aspect ratio of 70% or less.

17. The pneumatic tire according to claim 1, wherein a depth D1 of the at least one sipe is constant in a center portion of the sipe, and gradually decreases from the center portion to the end points Q1, Q2.

18. The pneumatic tire according to claim 1, wherein a first line that connects the flex points P1 and the end points Q1, and a second line that connects the flex points P2 and the end points Q2 are inclined in different directions with respect to the tire circumferential direction.

19. The pneumatic tire according to claim 18, wherein the land portion has trapezoidal shaped blocks, and the first line and the second line are disposed along an edge of a trapezoidal shape of the trapezoidal shaped blocks.

* * * * *